(12) United States Patent
Chauvel

(10) Patent No.: US 6,414,726 B1
(45) Date of Patent: Jul. 2, 2002

(54) DEVICE FOR IDENTIFYING PACKETS OF DIGITAL DATA AND A RECEIVER FOR DIGITAL TELEVISION SIGNALS EQUIPPED WITH SUCH A DEVICE

(75) Inventor: Gerard Chauvel, Antibes (FR)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 08/961,958

(22) Filed: Oct. 31, 1997

Related U.S. Application Data

(60) Provisional application No. 60/029,923, filed on Nov. 1, 1996.

(51) Int. Cl.$^7$ ................................................ H04N 5/455
(52) U.S. Cl. .................... 348/726; 348/465; 348/425.1; 348/714; 348/461
(58) Field of Search ................................. 348/726, 465, 348/461, 725, 425.1, 714, 399.1; 370/423, 464, 465; H04N 5/458

(56) References Cited

U.S. PATENT DOCUMENTS

| | | | |
|---|---|---|---|
| 5,182,799 A | | 1/1993 | Tamura et al. ............... 711/216 |
| 5,307,343 A | | 4/1994 | Bostica et al. .............. 370/398 |
| 5,742,361 A | * | 4/1998 | Nakase et al. ............... 348/423 |
| 5,802,063 A | * | 9/1998 | Deiss .......................... 348/469 |
| 5,898,695 A | * | 4/1999 | Fujii et al. ................... 370/464 |
| 5,960,006 A | * | 9/1999 | Maturi et al. ................ 348/512 |
| 5,966,385 A | * | 10/1999 | Fujii et al. ................... 370/465 |

FOREIGN PATENT DOCUMENTS

| | | | |
|---|---|---|---|
| EP | 0 679 028 A | 10/1995 | ............ H04N/7/58 |
| EP | 0 735 776 A | 10/1996 | |
| EP | 0 840 520 A2 | 5/1998 | ............ H04N/7/58 |

OTHER PUBLICATIONS

Fujii, et al., *Implementation of MPEG Transport Demultiplexer With a RISC–Based Microcontroller*, IEEE Transactions on Consumer Electronics, U.S., IEEE Inc., NY, vol. 42, No. 3, Aug. 1, 1996, pp. 431–438.

* cited by examiner

*Primary Examiner*—John W. Miller
*Assistant Examiner*—Linus H. Lo
(74) *Attorney, Agent, or Firm*—Gerald E. Laws; W. James Brady, III; Frederick J. Telecky, Jr.

(57) ABSTRACT

Circuitry for identifying digital data packets, each comprising a useful signal and a header signal containing data pertaining to the contents of the useful signal is provided. The circuitry includes a means (30) for extracting data from each header signal, which data is representative of a corresponding useful signal, a means for storing reference data in a memory, at addresses each corresponding to a packet type, and a means for comparing the data extracted from each header signal with said reference data stored in memory, and for the delivery, to a data processing unit (32,34), of an address signal indicating the nature of the corresponding packet. The data storage means and the comparison means preferably employ an associative memory (38) adapted to ensure the simultaneous comparison of the data extracted from each header signal with the reference data stored in memory.

10 Claims, 2 Drawing Sheets

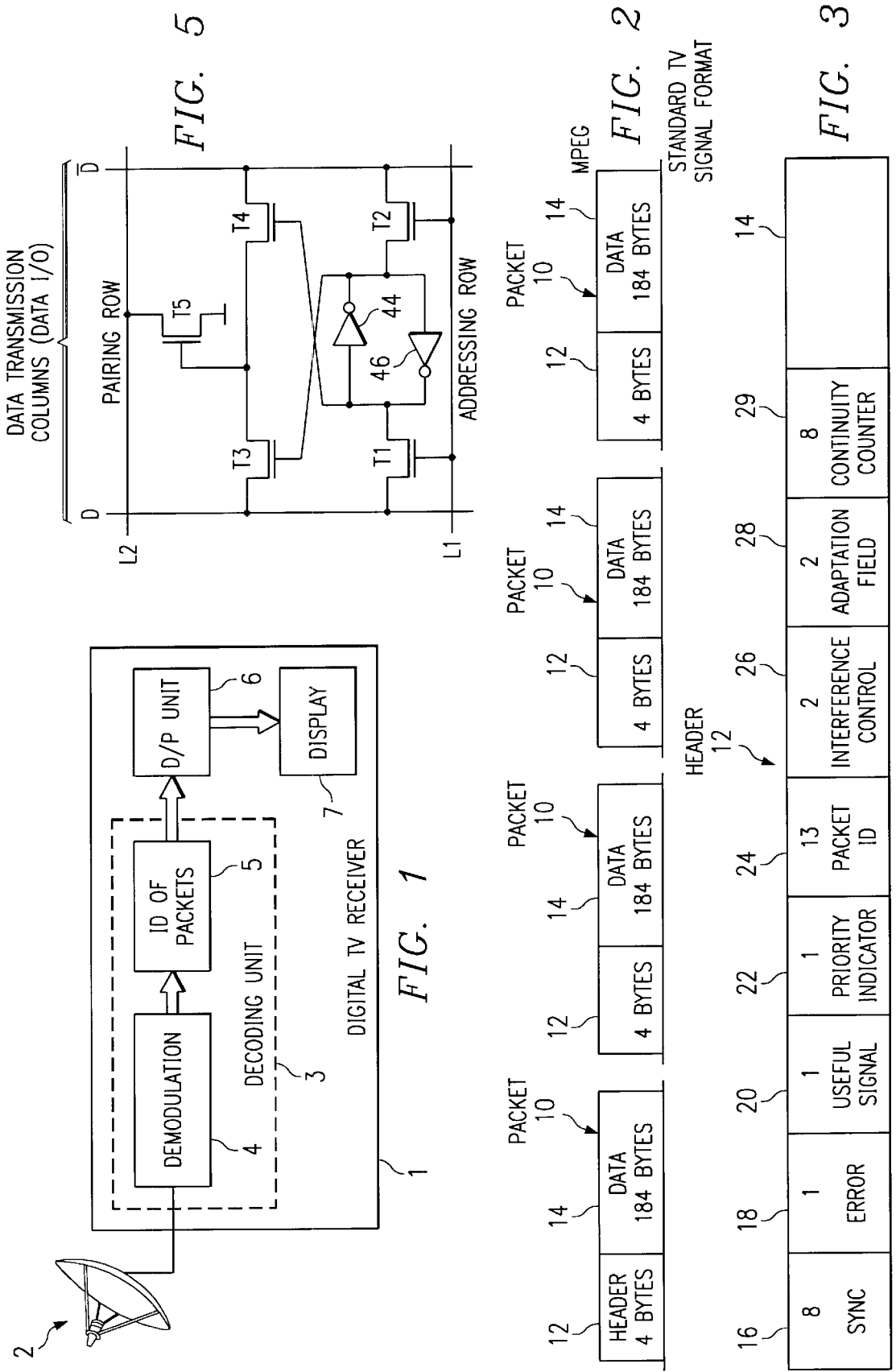

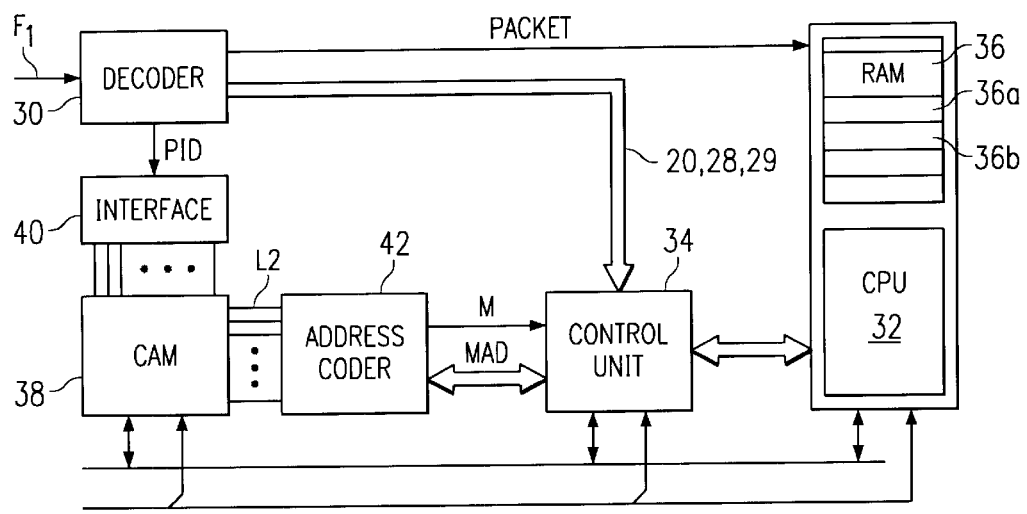
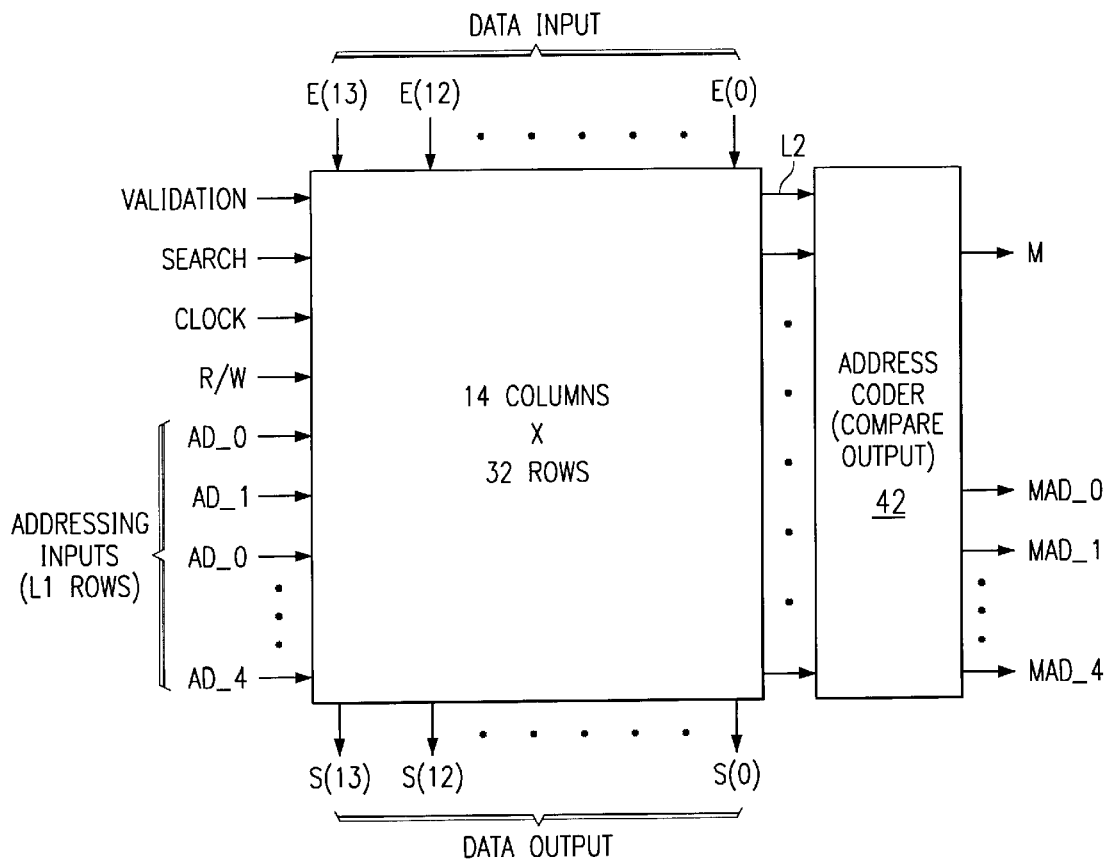

DEVICE FOR IDENTIFYING PACKETS OF DIGITAL DATA AND A RECEIVER FOR DIGITAL TELEVISION SIGNALS EQUIPPED WITH SUCH A DEVICE

This application claims priority under 35 USC §119(e)(1) of Provisional Application No. 60/029,923 filed Nov. 1, 1996.

FIELD OF THE INVENTION

This invention relates to circuitry of identifying packets of data to a receiver for digital television signals employing such circuitry.

BACKGROUND OF THE INVENTION

Currently, digital television signals are transmitted in a format known by the term MPEG.

According to this format, the signals are transmitted in the form of data packets, each comprising a useful signal and a header signal containing data pertaining to the contents of the useful signal.

A digital television signal generally consists of packets of various types, such as audio data packets, video data packets and packets containing information pertaining to the program transmitted.

In general, the decoding of television signals takes place in a decoder of a reception station, with the identification and the selection, in the incoming signals, of audio and video data packets and with the decoding of these packets so as to form data trains, of the audio and video types, respectively.

The audio data trains are decoded by means of an audio decoder for forming an analog acoustic signal.

Similarly, the video data trains are used to form an image as well as chrominance and luminance signals.

There are known devices for the identification of packets. These devices extract a piece of data from each header signal, which is representative of the type of the corresponding useful signal. They include a means for storing reference data in a memory, at addresses each corresponding to one packet type, and a means for comparing the piece of data extracted from each header signal with said reference data (stored in the memory) to deliver, to a data processing unit, an address signal indicating the nature of the corresponding packet.

The processing unit then selects the identified packets for decoding and for forming corresponding data trains.

In this type of identification device, the comparison between the piece of data extracted from the header signal and the reference data stored in memory is conducted successively; that is, at a transition of a synchronization clock, an extracted piece of data is compared to one of the reference pieces of data.

In addition, since the transmission rate of the packets is very high, the packet being identified must be stored, at least temporarily, for example, in a memory of the FIFO type, associated with a piloting circuit.

Consequently, this type of identification device is relatively slow and requires a large number of components.

The purpose of the invention is to overcome these drawbacks.

SUMMARY OF THE INVENTION

Circuitry for identifying digital data packets, each comprising a useful signal and a header signal containing data pertaining to the contents of the useful signal is provided. The circuitry includes a means (30) for extracting data from each header signal, which data is representative of a corresponding useful signal, a means for storing reference data in a memory, at addresses each corresponding to a packet type, and a means for comparing the data extracted from each header signal with said reference data stored in memory, and for the delivery, to a data processing unit (32,34), of an address signal indicating the nature of the corresponding packet. The data storage means and the comparison means preferably employ an associative memory (38) adapted to ensure the simultaneous comparison of the data extracted from each header signal with the reference data stored in memory.

An electronic device for identifying packets (10) of digital data, with each packet continuing a usefull signal (14) and a header signal (12) containing data about the contents of the useful signal (14) is provided that includes a means (30) for extracting a portion of data from each header signal, which is representative of the nature of the corresponding useful signal (14); memory storage means (38,44,46) for the reference data, at addresses each corresponding to one packet type; and comparison means (T3,T4,T5) for comparing the piece of data extracted from each header signal (12) with said reference data stored in memory and delivering data to a data processing unit (32,34) of an address signal indicating the type of the corresponding packet (10), wherein the memory storage means and the comparison means consist of an associative memory (38) adapted to ensure the simultaneous comparison of the piece of data extracted from each header signal with the reference data stored in memory.

BRIEF DESCRIPTION OF THE DRAWINGS

The invention will be understood better once the following description is read, which is only given as an example and made with reference to the attached drawings, in which:

FIG. 1 represents a general diagrammatic view of a digital television signal receiver;

FIG. 2 illustrates the general structure of a standard digital television signal;

FIG. 3 represents the structure of a data packet of the signal of FIG. 2;

FIG. 4 is a block diagram showing the architecture of the circuitry for identifying data packets according to the invention;

FIG. 5 illustrates the structure of a memory cell of the circuitry of FIG. 4; and FIG. 6 represents an enlarged view of the memory of the circuitry of FIG. 4.

DETAILED DESCRIPTION

The present invention pertains to a device for identifying digital data packets, which is particularly well suited for ensuring, in a station for the reception of digital television signals, the identification of packets of incoming data.

An electronic device for identifying packets (10) of digital data, with each packet continuing a useful signal (14) and a header signal (12) containing data about the contents of the useful signal (14) is provided that includes a means (30) for extracting a portion of data from each header signal, which is representative of the nature of the corresponding useful signal (14); memory storage means (38,44,46) for the reference data, at addresses each corresponding to one packet type; and comparison means (T3,T4,T5) for comparing the piece of data extracted from each header signal (12) with said reference data stored in memory and delivering data to a data processing unit (32,34) of an address signal indicating the type of the corresponding packet (10), wherein the memory storage means and the comparison means consist of an associative memory (38) adapted to ensure the simultaneous comparison of the piece of data extracted from each header signal with the reference data stored in memory.

Thus, the invention provides a device for identifying digital data packets of the above-mentioned type, characterized in that the memory storage means and the comparison means consist of an associative memory which is adapted so as to ensure the simultaneous comparison of the piece of data extracted from each header signal and the reference data stored in memory.

The invention also can comprise a characteristic as follows:

the associative memory comprises a network of rows and columns of memory cells each comprising a set of charge transistors for the storage of reference data, and a network of control transistors controlled by an address line to selectively connect said charge transistors to columns for transmission of said piece of data extracted from the header signal, each memory cell additionally comprising a set of transistors assembled as a comparator ensuring the comparison of the piece of data present in the columns for data transmission and the reference data stored in the charge transistors so that, when a reference byte stored in a memory cell row is identical to a byte present in the columns for data transmission, a pairing signal is delivered to a system for address coding connected to the data processing unit;

the memory cells are MOS transistor memory cells;

the associative memory preferably has a storage capacity of 32 bytes of 14 bits;

it also comprises a random-access memory controlled by the data processing unit for the successive storage in memory of data packets of the same type, in a zone corresponding to the type of the packet;

it also comprises a means for extracting, from each header signal, bits used for the numbering of packets of the same type, and supplying these bits to the data processing unit, for the selection of packets;

the means for extracting said piece of data from each header signal and said bits used for the numbering of packets consist of circuitry for decoding the header signal of each packet;

the digital data packets are packets of a digital television signal transmitted in series at a speed essentially equal to 60 Mbps; and the digital data packets are packets of a digital television signal which has been transmitted in parallel at a speed of approximately 7.5 Mbps.

The invention also provides a receiver for digital television signals, each consisting of a set of digital data packets, said device comprising a means for decoding the incoming digital signals, which are adapted so as to identify said data packets so they can be selected to form trains of packets of the same type and a means for processing said packets adapted so as to generate, from packets of the same type, corresponding analog signals and deliver these analog signals to a display device for video signals and a device for the transmission of acoustic signals, such that the decoding means comprises a means for identifying digital data packets as defined above.

In FIG. 1, the structure of a digital television signal receiver has been represented according to the MPEG format, designated by reference numeral 1.

This digital television receiver 1 receives at the input digital signals which are sensed by an antenna 2 or received by a cable of a wired network (not shown).

It comprises a decoding unit designated by reference numeral 3, receiving at the inlet the incoming digital signals, and comprising a demodulation device 4 of a known type connected to a device for the identification of digital data packets, designated by reference numeral 5.

The device for identifying packets 5 ensures the identification of packets of incoming data, so they can be selected to form trains of packets of the same type, and to deliver these trains of packets to a data processing unit 6, of a known type, which delivers corresponding analog signals to a device for displaying the video signals and transmitting the audio signals, designated by reference numeral 7.

In FIG. 2, the structure of a digital television signal has been represented, transmitted in the MPEG format 2.

According to the MPEG format 2, the signal consists of a set of digital packets, such as 10, each comprising 188 bytes and transmitted by a transmission device at a speed of approximately 60 Mbps in series, and at a speed of approximately 7.5 Mbps in parallel.

Each packet 10 consists of a header signal 12 comprising four bytes and a useful signal 14 of digital data, comprising 184 bytes.

FIG. 3 shows that the header signal 12 comprises different useful data for identifying and decoding the corresponding packet.

The data includes the following:

a synchronization indicator 16, coded with eight bits;

an indicator of transport errors 18, coded with one bit;

a start of useful signal indicator 20, coded with one bit;

a transport priority indicator 22, coded with one bit;

packet identifier 24, coded with thirteen bits;

a transport interference control indicator 26, coded with two bits;

an adaptation field control indicator 28, coded with two bits; and a continuity counter 29, coded with eight bits.

Each header signal 12 supplies the data pertaining to the contents of the useful signal with which it is associated.

Thus, the packet identifier 24 designated subsequently as PID, allows the identification of the nature of the packet to which it belongs and in this manner the continuity counter 29 allows the numbering of the packets of the same type.

It is also in this manner that the adaptation field control indicator 28 supplies information on the contents of the useful signal 14, using the following code:

a value "00" indicates that the corresponding packet must be eliminated;

a value of "01" indicates that, even if the beginning of useful signal indicator 20 is equal to "1," the useful signal starts with a header signal of a PES data train which indicates that a new image sequence or audio sequence is in the process of being transmitted, or that the useful signal contains a video or audio sequence; and a value "1X" indicates that the useful signal contains an adaptation field for the receiving device.

According to the last configuration, in which the adaptation field control indicator 28 is equal to "1X," the adaptation field for the receiving device notably contains operational fields for the coding of a discontinuity indicator coded with one bit, indicating that the corresponding packet must be used to initialize the reception system.

The digital television signal, whose structure has just been described, is received at the inlet of the packet identification device 5 (FIG. 1).

This device allows, on the one hand, the extraction of the PID packet identifier from a packet of instant data, whose structure has just been described, and, on the other hand, a comparison of the value of this PID with reference values each corresponding to a packet type, for the identification of the incoming packet.

Thus, it allows the identification and the grouping together of packets of the same type in view of their subsequent treatment.

With reference to FIG. 4, this identification circuitry or device of the present invention comprises a means for decoding the header signal of each packet consisting of a decoder 30 of a known type, a data processing system, consisting of a central processing unit 32 and a control unit 34, a RAM memory 36 and an associative memory, or memory which is addressable by the contents 38, associated with an interface 40 and an address coder 42, both of known types.

The device also comprises a set of buses connecting these different elements to each other.

The decoder 30 receives, at the input, as represented by the arrow F1, each packet and ensures the decoding of the header signal 12 so as to extract the beginning of useful signal indicator 20, the PID packet identifier 24, the adaptation field control indicator 28 and the continuity counter 29 (FIG. 2).

It transmits the extracted PID to the associative memory 38 by means of the interface 40.

In addition, it transmits the beginning of useful signal indicator 20, the adaptation field control indicator 28 and the continuity counter 29 to each control unit 34.

After having decoded the header signal 12, the decoder 30 transmits the corresponding packet to the random-access memory 36, for its storage in an address zone corresponding to the packet type.

The PID value is simultaneously compared, that is, during the course of the same transition of the synchronization clock with all the reference values stored in the associative memory 38, under the control of the control unit 34 and the central processing unit 32, as will be described in detail below.

As FIG. 5 shows, the associative memory 38 consists of a set of cells stored in memory consisting each of the association of four charge transistors, represented diagrammatically by two logic gates designated respectively by reference numerals 44 and 46.

The charge transistors 44 and 46 are connected to two complementary data transmission columns D and D bar by means of two control transistors T1 and T2 controlled by an addressing row L1.

It should be noted that this device corresponds to the arrangement of a standard RAM memory cell.

This cell is completed by transistors T3 and T4, which are assembled as a comparator, and whose sources are connected to each other and whose drains are connected to the data transmission columns D and D bar.

The column source of the transistors T3 and T4 is connected to the gate of another transistor T5 whose source is connected to ground and whose drain controls the voltage of a pairing row L2.

Advantageously, all the constituent elements of the memory cell are connected by MOS technology.

It should be noted that FIG. 5 represents a single memory cell.

Naturally, the associative memory 38 consists of a network of identical cells arranged in rows and columns, each row being addressable by a corresponding addressing row L1 and controlling the voltage of a pairing row L2.

Thus, one can see in FIG. 6, that the associative memory 38 comprises 32 rows and 14 columns, thus allowing the storage in memory of 32 bytes of 14 bits, corresponding to the 32 types of PID coded with 14 bits.

It comprises 14 data input lines, E(0) to E(13), and 14 data output lines, S(0) to S(13), these input and output data lines being connected to the data transmission columns D and D (FIG. 5).

It also comprises 5 addressing inputs, AD_0 to AD_4, for the coding and the selection of the 32 addressing rows L1 (FIG. 5).

It also receives validation signals V, search signals S, and clock signal C and read/write control signals designated R/W.

The operation of the identification devices is as follows.

During the actuation of the receiver in which the packet identification device is located, which has just been described, the first incoming packets are used for the initialization of the system.

They contain, in particular, reference PID values.

In the standard manner, 32 types of packets, which can be transmitted by a single digital television signal, and 32 reference values are transmitted during the initialization. These reference values each correspond to a type of packet and they are stored in the associative memory 38 at addresses each corresponding to one type of packet, according to the following procedure.

A first reference PID value is presented on the input lines E(0) to E(13) of the memory 38. The central processing unit 32 positions the validation input V of the memory at a high level and the R/W (read/write) input of this memory at a low level, and it selects a first addressing row L by means of the addressing inputs AD_0 to AD_4 so as to store in memory this first reference value at a first address of the memory.

This cycle is repeated so as to store in memory the 32 reference packet identifier values in the 32 cell rows of the associative memory 38.

After performing this initialization cycle, it is possible for the central processing unit 32 to read the contents of this memory by positioning the R/W input at a high level.

During a transition of the clock signal present on the input line T, the control transistors T1 and T2 (FIG. 5) corresponding to an addressing row selected by the inputs AD_0 and AD_4 are opened and the byte stored in memory in the corresponding memory cell row is delivered at the output to the output lines S(0) to S(13).

To identify an incoming packet, the central processing unit 32 selects the search mode in the control unit 34 by positioning the input S of the memory at a high level.

From then on, each new PID represented on the input E(0) to E(13) is simultaneously compared, during the same clock transition, to the contents of the bytes of 14 bits stored in the memory.

When the PID value extracted from the incoming packet by the decoder 30 corresponds to a reference PID value stored in the memory, the latter delivers to the address coder 42 a signal which corresponds to the pairing row L2 connecting the memory cells which ensure the storage of the corresponding PID reference byte.

In response to this address signal, the coder 42 delivers to the control unit 34, a pairing address signal M associated with the corresponding address coded in 5 bits, available on the addressing rows MAD_0 to MAD_4.

It should be noted that if a PID value corresponds to several reference PID values, the address used is the lowest address.

Moreover, the identification device performs a selection of the packets received, using the beginning of useful signal indicator 20, the adaptation field control indicator, and the continuity counter 29.

In particular, when the adaptation field control indicator is equal to "00," the packet is eliminated.

In addition, the device uses, in particular, the continuity counter 29 which corresponds to a numbering of the packets of the same time which is incremented by "1" when two successive packets of the same PID are transmitted.

In this manner one can see that if two packets of the same successive PID have the same continuity counter value, then these packets are identical, and one must be eliminated.

Similarly, if the value of the continuity counters of two successive packets of the same type presents discontinuity, the packet causing the discontinuity must be recovered.

To perform this selection, the central processing unit 32 causes the storage in the RAM memory of, on the one hand, the continuity counter value 30 of the packet transmitted earlier to the address 36a and, on the other hand, the value of the continuity counter of the packet which is in the process of being transmitted to the address 36b.

It calculates the difference between these values and, if no discontinuity exists, causes the transfer of a packet identified in the RAM memory 36 to an address zone corresponding to the type of packet identified and in which the preceding packets of the same type were stored earlier.

Thus, the packets which have been identified and stored in each address zone of the RAM 36 have been subjected to a preselection and they can thus be submitted to a subsequent processing in the digital television signal receiver, particularly in the data processing device 6 (FIG. 1).

One can see that the invention which has just been described ensures the identification and rapid selection of packets of digital television data.

This device does not require any memory for the storage of packets which are in the process of being identified and thus it allows a saving of components, on the order of 40% compared to the devices of the prior art.

What is claimed:

1. Packet identification circuitry, comprising:
   packet header decoder for extracting a portion of data from a packet header, said portion indicating at least a certain packet type; and
   associative memory coupled to said decoder for storing reference data corresponding to a plurality of packet types, for simultaneously determining if a piece of said portion of data matches any one of said reference data stored in said memory, and for outputting a signal representative of said matching, wherein the associative memory comprises an input port coupled to the packet header decoder to receive the portion of data extracted from a packet header and a network of rows and columns of memory cells each comprising:
   a set of charge transistors for storing the reference data received on the input port, such that each row stores a byte of reference data corresponding to one of the plurality of packet types; and
   a set of transistors assembled as a comparator ensuing the simultaneous comparison between the portion of data extracted from a packet header and of the reference data stored in the charge transistors so as to deliver, when a reference byte stored in a memory cell row is identical to a byte present on the input port, a pairing signal to an address coding system for indicating which row contained the identical reference byte.

2. An electronic device for identifying packets (10) of digital data, with each packet continuing a useful signal (14) and a header signal (12) containing data about the contents of the useful signal (14), comprising:
   a means (30) for extracting a portion of data from each header signal, which is representative of the nature of the corresponding usefull signal (14);
   memory storage means (38,44,46) for reference data, at addresses each corresponding to one packet type; and
   comparison means (T3,T4,T5) for comparing the piece of data extracted from each header signal (12) with said reference data stored in memory and delivering data to a data processing unit (32,34) of an address signal indicating the type of the corresponding packet (10), wherein the memory storage means and the comparison means consist of an associative memory (38) adapted to ensure the simultaneous comparison of the piece of data extracted from each header signal with the reference data stored in memory, wherein the associative memory (38) comprises a network of rows and columns of memory cells each comprising a set of charge transistors (44,46) for the storage of reference data, and control transistors (T1,T2) controlled by an addressing row (L1) for the selective connection of said charge transistors (44,46) to columns (D,D) for the transmission of said (PID) data extracted from the header signal (12); each memory cell also comprising a set of transistors (T3,T4,T5) assembled as a comparator ensuring the comparison between the data present in the columns (D,D) for the data transmission and the reference data stored in the charge transistors (44,46) so as to deliver, when a reference byte stored in a memory cell row is identical to a byte present in the data transmission columns, a pairing signal (M) to an address coding system (42) connected to the data processing unit (32,34).

3. The device of claim 2, wherein the memory cells are MOS transistor memory cells.

4. The device of claim 2, wherein the associative memory is an associative memory with a storage capacity of 32 bytes of 14 bits.

5. The device of claim 2, further comprising a random-access memory (36) controlled by the data processing unit (32,34) for successive storage in memory of data packets of the same type, in a zone corresponding to the packet type.

6. The device of claim 2, further comprising a means (30) for extracting, from each header signal, bits (29) used for the numbering of the packets of the same type, and for supplying these bits to the data processing unit for the selection of the packets.

7. The device of claim 2, wherein the means for extracting said data from each header signal and said bits used for the numbering of the packets consists of material means (30) for decoding the header signal (12) of each packet.

8. The device of claim 2, wherein the packets (10) of digital data are digital television signal packets which have been transmitted in series at a speed of approximately 60 Mbps.

9. The device of claim 2, wherein the packets (10) of digital data are digital television signal packets which have been transmitted in parallel at a speed of approximately 7.5 Mbps.

10. A digital television signal receiver with each signal consisting of a set of digital data packets, comprising:

decoding means (3,4,5) for decoding the incoming digital signals, adapted to identify said data packets so they can be selected to form trains of packets of the same type and a means for processing said packets (6) adapted so as to generate, from packets of the same type, corresponding analog signals and deliver these analog signals to a device for displaying the video signals and transmitting the acoustic signals (7), wherein that the decoding means comprises:

a means (30) for extracting a portion of data from each header signal, which is representative of the nature of the corresponding useful signal (14);

memory storage means (38,44,46) for the reference data, at addresses each corresponding to one packet type; and comparison means (T3,T4,T5) for comparing the piece of data extracted from each header signal (12) with said reference data stored in memory and delivering data to a data processing unit (32,34) of an address signal indicating the type of the corresponding packet (10), wherein the memory storage means and the comparison means consist of an associative memory (38) adapted to ensure the simultaneous comparison of the piece of data extracted from each header signal with the reference data stored in memory, wherein the associative memory (38) comprises a network of rows and columns of memory cells each comprising a set of charge transistors (44,46) for the storage of reference data, and control transistors (T1,T2) controlled by an addressing tow (L1) for the selective connection of said charge transistors (44,46) to columns (D,D) for the transmission of said (PID) data extracted from the header signal (12); each memory cell also comprising a set of transistors (T3,T4,T5) assembled as a comparator ensuring the comparison between the data present in the columns (D,D) for the data transmission and the reference data stored in the charge transistors (44,46) so as to deliver, when a reference byte stored in a memory cell row is identical to a byte present in the data transmission columns, a pairing signal (M) to an address coding system (42) connected to the data processing unit (32,34).

\* \* \* \* \*